June 9, 1964 P. J. REYNOLDS 3,136,204
BLIND FASTENER CONSTRUCTION
Filed Sept. 27, 1961

INVENTOR.
Perry J. Reynolds.
BY
Harness, Dickey & Pierce
ATTORNEYS.

United States Patent Office 3,136,204
Patented June 9, 1964

3,136,204
BLIND FASTENER CONSTRUCTION
Perry J. Reynolds, Detroit, Mich., assignor to Huck Manufacturing Company, Detroit, Mich., a corporation of Michigan
Filed Sept. 27, 1961, Ser. No. 141,117
1 Claim. (Cl. 85—40)

The present invention relates to blind rivets and particularly relates to an improvement over a blind rivet of the type described in Huck Patent 2,114,493.

Blind rivets of the type to which the ones of the present invention are directed comprise a sleeve having a preformed head at one end and a pin which extends through a longitudinal opening in the sleeve and which has a performed head at the end adjacent the end of the tubular portion opposite to that of the sleeve head. The pin is formed with pull means at the end opposite the pin head and is provided with locking grooves intermediate the pin head and the pull means with a breakneck disposed adjacent the locking grooves and between the locking grooves and the pull means.

The pin and sleeve assembly are inserted through aligned holes of members to be pulled and secured together and a pulling tool is applied to the end of the pin and against the head of the sleeve. The pull means causes the pin to be pulled and at the same time a reaction force is applied against the head of the sleeve by an anvil in the pull gun which causes the head of the pin to be pulled against the projecting end of the tubular portion of the sleeve to form a blind head on the sleeve.

In certain prior blind rivets the blind head is in the form of a bulb and such blind rivets have little or no pull together. By "pull together" is means the ability of the blind fastener to pull separated sheets or panels together so that when the rivet is finally set the adjacent faces of the sheets are secured tightly against each other. In the type of blind fastener in which the bulbed head is formed the only pull together that can be accomplished is that that is caused by the radial bending of the sleeve around the periphery of the opening in the adjacent panel and this is quite small.

According to the present invention the head configuration of the pin is such that in cooperation with the end of the sleeve substantial pull together is accomplished as the blind head is formed. Rather than being in the form of a bulbed head the head is in the form of a tulip so that as the pin head is pulled toward the work, the sleeve is caused to pass around and beyond the pin head forming the tulip head and at the same time progressively pulling the sheets tightly together. Also, according to the structure of the present invention the head of the sleeve is swaged into locking grooves in the pin, after the pin head has reached its final position, and as the swaging of the head progresses the pin is placed under substantial tensile preload.

One of the primary objects of the present invention is to provide a blind fastener which has considerably more pull together ability than prior blind fasteners of the same general type.

A further object of the invention is to provide a blind fastener having good pull together characteristics and also having a high tensile preload in the final fastener as set, which greatly improves the strength and fatigue values of the fastener.

Other objects will become apparent from the following specification, the drawing relating thereto and the subjoined claims.

In the drawing in which like numerals are used to designate like parts in the several views throughout;

Figure 1:
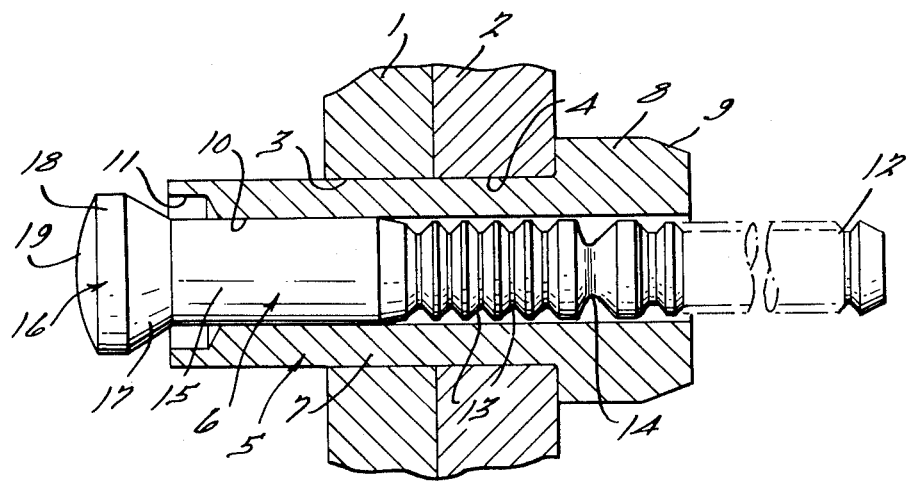
FIGURE 1 is a longitudinal and cross sectional view illustrating the blind rivet of the present invention, and showing such blind rivet as applied to sheets or panel members to be secured together, prior to setting of the rivet.

Referring to the drawings, 1 and 2 illustrate a pair of sheets or panels having aligned openings 3 and 4. The blind fastener comprises a sleeve generally indicated at 5 and a pin generally indicated at 6 which are assembled as shown and which are positioned through the aligned openings 3 and 4.

The sleeve 5 comprises a tubular portion 7 terminating in a preformed head 8 at one end. The head 8 has an annular hold-off taper 9 formed thereon.

The sleeve 5 has a longitudinal hole 10, which is circular in cross section, formed therein and which terminates in a counter bore 11 adjacent the end of the tubular portion 7 opposite to the head 8.

The pin 6 is assembled to project through the openings 10 having one end indicated at 12 which projects beyond the end of the head 8 and which is formed with a plurality of pull grooves. Such pull grooves may be in the form of annular grooves extending along the end of the pin or may be otherwise formed as, for example, in the form of a pull knob. A plurality of longitudinally spaced annular locking grooves 13 are formed in the pin intermediate the ends thereof. A reduced annular breakneck portion 14 is also formed in the pin 6 adjacent the locking grooves 13 and between the locking grooves 13 and the pull grooves 12.

The pin 6 is formed with a smooth cylindrical portion 15 between the locking grooves 13 and the opposite end of the pin and such portion 15 is preferably of such a diameter as to provide a press or snug fit within the opening 10 so that to hold the parts together in assembly.

The other end of the pin is provided with a pin head 16 having an annular conical portion 17 adjacent the cylindrical portion 15. The pin head 16 is provided with an annular head portion 18 terminating in a crowned end 19 so that the conical portion 17 will be backed up by sufficient body that the head will not collapse as it is pulled into the sleeve. The portion 18 of the head is slightly larger than the counter bore 11 but smaller than the outside diameter of the adjacent tubular portion 7 of the sleeve 5.

A driving tool, well known in the art, is employed to set the fastener and comprises a gripping portion which grips the pull grooves 12 and has a cooperating anvil which engages the hold-off taper 9 to apply a reaction force as the pin 6 is pulled. The hold-off taper 9 prevents premature swaging of the head 8 until after the blind head is formed and the sheets are pulled tightly together. During this initial pulling of the pin, and before the swaging of the sleeve head, the tapered portion 17 of the pin head 16 is pulled into the counter bore 11 and into the opening 10 causing the sleeve to pass around the head 16 as the pulling progresses and causing the sheets 1 and 2 to be pulled tightly together, if initially separated. The counter bore 11 prevents splitting of the tubular portion 7 of the sleeve as the blind head is formed so that the blind head remains solid in section and does not split along its length.

Figure 2:
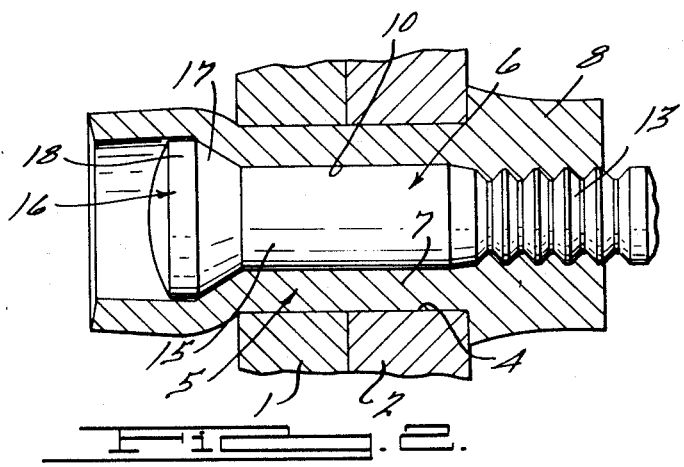
FIG. 2 is a view similar to FIG. 1 showing completion of the swaging operation and after pin break and showing the fastener in longitudinal and cross section as in its final setting.

Since the head 16 has sufficient body backing up the tapered or conical portion 17 the head will not collapse and cannot be pulled through the sleeve when it reaches its final position as shown in FIG. 2. Since the pin can no longer be moved, the reaction force of the anvil in the pull means against the annular hold-off taper 9 causes the head 8 to be swaged inwardly into the locking grooves. During the initial portion of this swaging operation one of the outermost grooves will be initially engaged by the adjacent metal of the sleeve head 8 thus locking the head 8 and the sleeve together so that there can be no further relative movement between the pin and the sleeve. As the swaging progresses the diameter of the head is reduced so that part of the metal flows into the locking grooves and the additional metal goes into length causing the head 8 to elongate slightly which reacts against the adjacent sheet and places the pin 6 under additional tension, such tension being identified as tensile preload.

A further pulling of the pin causes the force to build up so that the pin breaks at the breakneck 14.

When the fastener is finally set the plates have thus been tightly pulled together, a blind head of a tulip form has been formed around and about the pin head, the sleeve has been swaged to the pin and the pin placed under tension so that an exceptionally tight fastener having high tensile strength and high push-out properties is provided.

Formal changes may be made in the specific embodiment of the invention disclosed without departing from the spirit and substance of the invention, the scope of which is commensurate with the appended claim.

What is claimed is:

A blind rivet comprising a sleeve and a pin, said sleeve comprising a tubular portion terminating in an annular sleeve head at one end and having a central bore extending therethrough terminating in a counterbore at the opposite end, said counterbore defined by a radial wall tapering radially and axially inwardly at a preselected angle relative to a radial plane normal to the axis of said central bore, said pin comprising a shank portion having a maximum diameter substantially equal to the diameter of said central bore and a pin head at one end of said shank portion adapted to be located within said opposite end, said pin head having a conical portion adapted to engage said radial wall of said counterbore whereby the wall of said tubular portion is expanded radially outwardly as said pin head is moved through said central bore, said pin head having an annular head portion adjacent said conical portion of a slightly larger diameter than said counterbore, said conical portion tapering in the same direction as said radial wall at an angle greater than said preselected angle, and extending axially for a distance substantially greater than that of said radial wall and of said annular head portion, said pin head terminating in a crowned end portion adjacent said annular head portion of a preselected thickness whereby said pin head will not collapse as it is pulled into said central bore, said pin having pull means at the end opposite to said pin head and having a locking groove formed therein between said pin head and said pull means adapted to be located substantially coaxially with said sleeve head, said sleeve head being generally a right circular cylinder terminating at its outer end in a radially inwardly tapering hold-off portion, said sleeve head being deformable into said locking groove for locking said pin and said sleeve together when said rivet is set by pulling said pin and applying a reaction force having a radially inwardly directed component to said sleeve head, that portion of said shank adjacent said pin head being substantially smooth and of a diameter substantially the same as the remainder of said shank.

References Cited in the file of this patent

UNITED STATES PATENTS

| | | |
|---|---|---|
| 2,061,628 | Huck | Nov. 24, 1936 |
| 2,061,629 | Huck | Nov. 24, 1936 |
| 2,183,543 | Cherry | Dec. 19, 1936 |
| 2,384,321 | Lees | Sept. 4, 1945 |
| 2,501,567 | Huck | Mar. 21, 1950 |
| 2,931,532 | Gapp | Apr. 5, 1960 |

FOREIGN PATENTS

| | | |
|---|---|---|
| 720,978 | Great Britain | Dec. 29, 1954 |